United States Patent [19]

Richards

[11] 4,194,770

[45] Mar. 25, 1980

[54] COMPRESSION FITTING

[75] Inventor: Donald L. Richards, Durham, N.C.

[73] Assignee: Eaton Corporation, Cleveland, Ohio

[21] Appl. No.: 882,542

[22] Filed: Mar. 1, 1978

[51] Int. Cl.² .......... F16L 5/02

[52] U.S. Cl. .......... 285/206; 200/288; 277/166

[58] Field of Search .......... 152/427; 220/288; 222/568; 277/166; 285/206

[56] References Cited

U.S. PATENT DOCUMENTS

| | | | |
|---|---|---|---|
| 2,277,713 | 3/1942 | Parker | 220/288 |
| 2,928,449 | 3/1960 | Hosking | 152/427 |
| 3,104,120 | 9/1963 | Myers | 285/206 |
| 3,335,923 | 8/1967 | Healy | 220/288 |

*Primary Examiner*—Robert I. Smith

*Attorney, Agent, or Firm*—R. J. McCloskey; F. M. Sajovec, Jr.

[57] ABSTRACT

A pressure and liquid tight compression fitting particularly adapted for attachment to a beverage container. An externally threaded body portion of the fitting is inserted through a wall of the container and is clamped to the wall by means of a nut. A first pressure seal is effected by an O-ring received in a groove formed in the face of the nut in contact with the container wall. A first liquid seal is effected by a thin lip formed at the outer edge of the nut, beyond the O-ring. A combined second pressure seal and second liquid seal is effected by interfitting tapered sections of the body portion and the nut beyond the threaded connection between the body and the nut.

14 Claims, 3 Drawing Figures

COMPRESSION FITTING

The present invention relates generally to fluid fittings, and more particularly to a pressure and liquid tight fitting for a beverage container.

In the beverage dispensing industry it is important that all components, such as fluid fittings which come into contact with the beverage or beverage syrup be free of surfaces and/or areas where the beverage or syrup is likely to collect and possibly promote the growth of bacteria. As a result, prior art components for such applications are generally welded directly to the tank or other device in which the component is used. While compression-type threaded fittings are most desirable from the standpoint of cost and replaceability, such fittings have not been considered satisfactory for such application because of the fact that the beverage or syrup tends to work its way into the threads and into the junction between the device and the fittings by capillary action.

It is an object of the present invention to provide a compression fitting suitable for use in contact with an ingestible liquid such as a beverage or a beverage syrup.

Another object of the invention is to provide a compression fitting having both pressure seals, and liquid seals, said liquid seals resisting the penetration of liquid between parts of the fitting and the device to which it is attached, and between component parts of the fitting.

Another object of the invention is to provide a compression fitting as above using a minimum of separate, rubber seals.

To meet the above objectives, the present invention provides a fitting suitable for attachment to a pressurized container which includes a threaded male member adapted to extend through an aperture formed in a wall of the container, and a mating nut which acts against the inside of the container wall to clamp the fitting to the wall. The surface of the nut in contact with the container has a groove formed therein to receive an O-ring pressure seal, and a thin lip is formed at the edge of the wall to form a liquid seal which is resistant to the entry of liquid by capillary action. A combined pressure and liquid seal is formed between the nut and the male member of the fitting to prevent the entry of liquid between the threads.

Other objects and advantages of the invention will become more apparent from the following description when taken in connection with the accompanying drawing, wherein.

Figure 1:
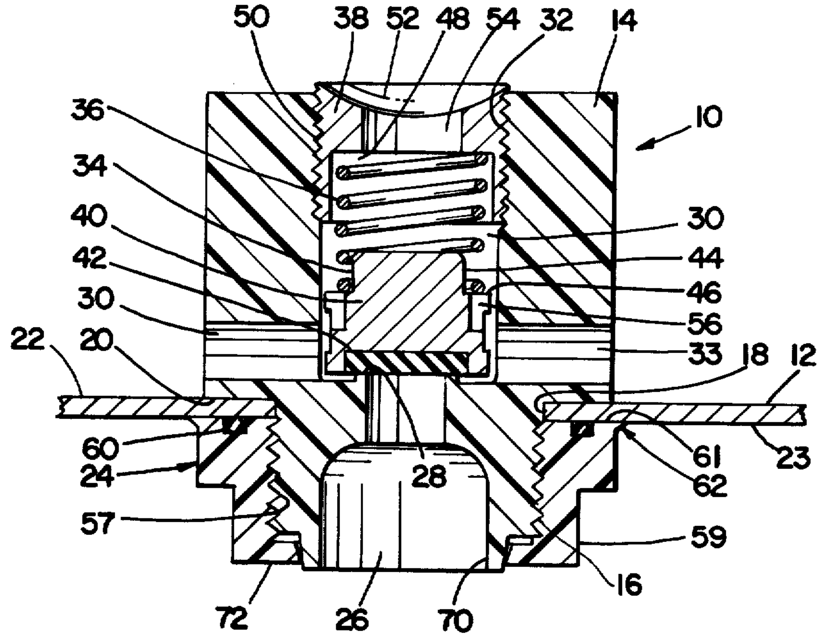
FIG. 1 is a cross-sectional view of a fitting incorporating the present invention.

Referring to the drawings, the inventive fitting, designated generally by the numeral 10, is for illustrative purposes shown as a pressure relief valve. It should be noted that in the context of the present invention the fitting can be any device attached to a wall of a container or the like and exposed to the interior thereof. It can be appreciated, then, that in the following description and claims the term "fitting" is not to be interpreted as being restricted to a relief valve or any other specific type of fluid component.

Referring specifically to FIG. 1, the fitting 10 is illustrated as it is installed in a pressurized beverage container, one wall of which is illustrated at 12. The fitting illustrated herein is a relief valve having a body 14 including an externally threaded portion 16 which is inserted through an aperture 18 formed through the wall 12 to a position where a shoulder 20 bottoms on the outer surface 22 of the wall 12. A nut 24, the details of which will be described later, threadedly engages the externally threaded portion 16 to clamp the fitting to the wall.

The body 16 is illustrated as being of generally cylindrical configuration and is preferably fabricated as a molded plastic part. It includes an inlet passage 26 passing through the threaded portion, and terminating at an annular sealing surface 28. The inlet passage 26 is in communication with a concentric valve bore 30, which includes an internally threaded portion 32.

Also communicating with the valve bore 30 are a plurality of outlet passages 33 open to the atmosphere.

Received within the valve bore 30 are a poppet assembly 34, a load spring 36, and a retainer 38. The poppet assembly 34 is in the form of a cylindrical plug 40, preferably formed of metal, and an elastomeric sealing element 42 which is press-fit into a depression formed in the plug 40. The spring 36 fits over a reduced diameter portion 44 of the plug and bears against a shoulder 46. The other end of the spring 36 is received within a cavity 48 formed in the retainer 38. The retainer 38 includes an externally threaded portion 50 which is received in the internally threaded portion 32 of the body 14. A slot 52 is formed in the top of the retainer 38 to facilitate insertion and adjustment. A vent hole 54 is also formed through the retainer.

The spring 36 biases the poppet assembly downward to bring the elastomeric seal 42 into sealing engagement with the annular sealing surface 28. As is well-known in the art, when the pressure within the tank or other device to which the fitting 10 is attached exceeds a predetermined value, the pressure acting on the seal 42 will overcome the spring bias, and the poppet assembly will lift off the seal 28 to relieve the pressure through the outlet passages 33. To avoid pressure buildup above the poppet assembly, the plug 40 can be provided with a plurality of relief slots 56.

As noted above, the pressure relief function of the fitting 10 forms no part of the present invention, and has been described herein for purposes of illustration only.

The nut 24 is preferably formed of a molded plastic material, and includes an internally threaded portion 57 for attachment to the externally threaded portion 16 of the body 14. A portion 59 of the nut can be hex-shaped to facilitate attachment.

To provide a first pressure seal between the nut 24 and the container, a groove 58 is formed in the upper surface 61 of the nut 24, and receives an O-ring 60, which seals against the inner surface 23 of the wall 12 of the container.

Figure 2:
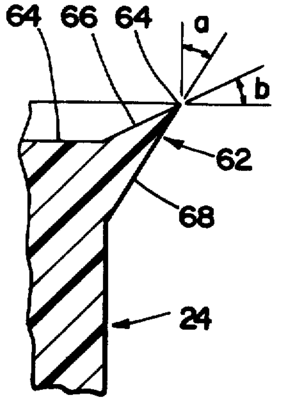
FIG. 2 is an enlarged sectional view of a first portion of the nut which is part of the present invention.

A first liquid sealing element is formed as a lip 62 at the intersection of the outer diameter of the nut 24 and the upper surface 61. Referring to FIG. 2, in its free state, the lip 62 extends outwardly and upwardly, ending in a knife edge 64. The inner wall 66 of the lip is formed at an angle a to a line parallel to the axis of the nut, and the outer wall 68 is fomed at an angle b to a line perpendicular to the axis of the nut. In the preferred embodiment, angles a and b are 30°; however, angles of 20° to 40° can be expected to provide satisfactory results.

Figure 3:
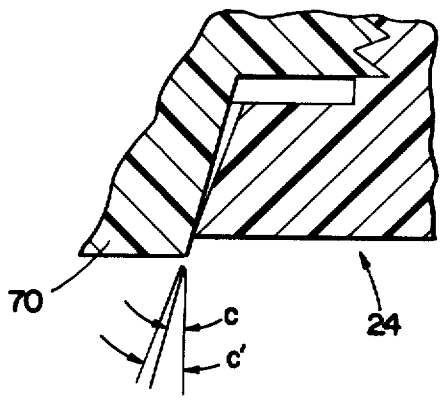
FIG. 3 is an enlarged sectional view of a portion of the fitting of FIG. 1.

A combined second pressure seal and second liquid seal between the nut 24 and the body 14 is formed at the base of the body 14. To effect such seal, the body 14 includes an extended portion 70 extending beyond the threaded portion 16. Referring to FIG. 3, wherein a portion of the fitting is shown before the nut 24 is fully threaded onto the threaded portion 16, the extended portion 70 is formed with its outer surface at an angle depicted as c to a line parallel to the axis of the body 14. The nut 24 includes an inwardly directed portion 72 having its inner surface formed at an angle depicted as c' to a line parallel to the axis of the nut. The angle c' is slightly greater than the angle c, and the minimum inside diameter of the inner surface of the inwardly directed portion 72 is slightly smaller than the minimum outside diameter of the outer surface of the extended portion 70 to effect a press fit. In the preferred embodiment the angle c is 15°, and the angle c' is 20°. In practice, satisfactory results can be expected if angle c has a value between 5° and 25°, and angle c' has a value between 10° and 30°, with the difference between angle c and angle c' being between 3° and 10°.

When the fitting 10 is attached to a wall 12 of a container, the threaded portion 16 of the body 14 is inserted into the aperture 18 until the shoulder 20 bottoms against the outer wall 22. The nut 24 is then threaded onto the body 14. As the upper surface 61 of the nut tightens against the inner surface 23 of the wall 12, the O-ring 60 effects a first pressure seal in a conventional manner. At the same time, the lip 62 is compressed against the surface 23, forming a first liquid-tight seal. A combined second pressure seal and second liquid-tight seal is formed below the threaded portion 16 by the press fit effected between the frusto-conical inner surface of the inwardly directed portion 72 of the nut 24 with the frusto-conical outer surface of the extended portion 70 of the body 14. The second liquid-tight seal is effective to prevent liquid from entering the threaded connection between the threaded portions 16 and 57.

I claim:

1. A fluid fitting for compression attachment to a liquid container, comprising a body; a cylindrical projection extending from said body and adapted to be exposed to said liquid, said projection including an externally threaded portion, and a non-threaded portion; and a nut interfitting with said projection, said nut including an internally threaded portion engageable with the threaded portion of said projection, a face adapted to engage an interior surface of said container, an outer side surface formed generally perpendicular to said face, first pressure sealing means on said face, a lip extending upwardly from said face and outwardly from said outer side surface to define first liquid sealing means, and combined second pressure sealing means and second liquid sealing means engageable with the non-threaded portion of said projection.

2. Apparatus as claimed in claim 1, in which said face of said nut has an annular groove formed therein, and said first pressure sealing means comprises a deformable sealing ring received in said groove.

3. Apparatus as claimed in claim 1, in which said lip has an inner wall extending upwardly from said face, and an outer wall extending outwardly from said outer side surface, said inner and outer walls intersecting to form a knife edge at the outer edge of said lip.

4. Apparatus as claimed in claim 3, in which said inner wall is formed at an angle of 20° to 40° relative to said face, and said outer wall is formed at an angle of 20° to 40° relative to said outer side surface.

5. Apparatus as claimed in claim 1, in which said combined second pressure sealing means and second liquid sealing means comprise an inwardly directed lip portion engageable with the non-threaded portion of said projection.

6. Apparatus as claimed in claim 5, in which said non-threaded portion of said projection comprises a frusto-conical portion coaxial with said projection and extending axially from said projection away from said body.

7. Apparatus as claimed in claim 6, in which the outer surface of said non-threaded portion and the inner surface of said inwardly directed lip portion define mutually engaging frusto-conical surfaces.

8. Apparatus as claimed in claim 7 in which said outer surface of said non-threaded portion is formed at a first angle, and said inner surface of said inwardly directed lip portion is formed at a second angle greater than said first angle.

9. Apparatus as claimed in claim 8, in which the minimum inside diameter of the inner surface of said inwardly directed lip portion is smaller than the minimum outside diameter of the outer surface of said non-threaded portion.

10. Apparatus as claimed in claim 8, in which said second angle is 3° to 10° greater than said first angle.

11. Apparatus as claimed in claim 8 in which said first angle has a value between 5° and 25° to the longitudinal axis of said fitting, and said second angle has a value between 10° and 30° to the longitudinal axis of said fitting.

12. In combination with a liquid container to which it is attached, a fluid fitting comprising a body; a cylindrical projection extending from said body into the interior of said liquid container, said projection including an externally threaded portion and a non-threaded portion; a nut interfitting with said projection including an externally threaded portion engageable with the threaded portion of said projection; a face formed on said nut engageable with an interior wall surface of said container; an outer side surface formed on said nut generally perpendicular to said face; first pressure sealing means disposed between said face and said interior wall surface; a lip formed on said nut extending upwardly from said face and outwardly from said side surface to prevent the entry of liquid between said nut and said container and combined second pressure sealing means and second liquid sealing means defined by said nut and the non-threaded portion of said projection to prevent the entry of liquid between the threaded portion of said projection and said nut.

13. Apparatus as claimed in claim 12, in which said face formed on said nut has an annular groove formed therein, and said first pressure sealing means comprises a deformable sealing ring received in said groove.

14. Apparatus as claimed in claim 12, in which said combined second pressure sealing means and second liquid sealing means comprise an inwardly directly lip portion engageable with the non-threaded portion of said projection, the outer surface of said non-threaded portion and the inner surface of said inwardly directed lip portion defining mutually engaging frusto-conical surfaces.

* * * * *